Feb. 2, 1926.
C. LE G. FORTESCUE
1,571,256
ELECTRICAL PROTECTIVE DEVICE
Filed August 9, 1920
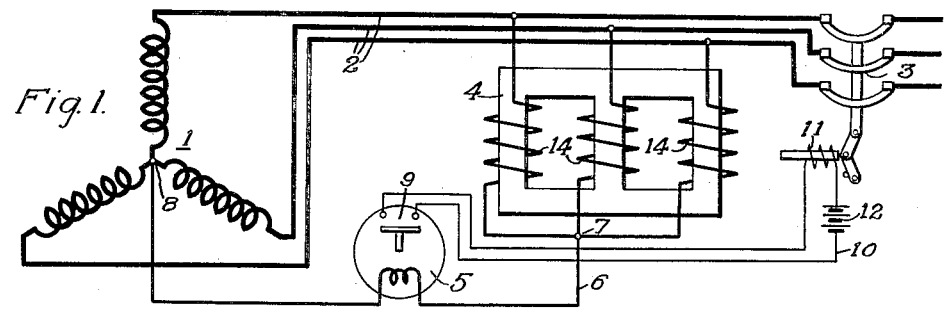
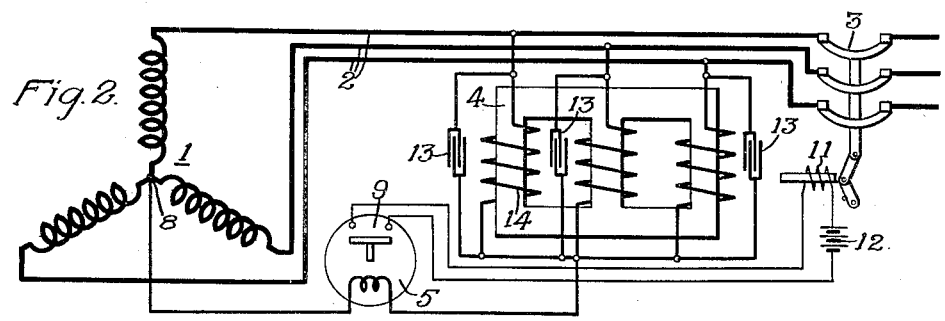
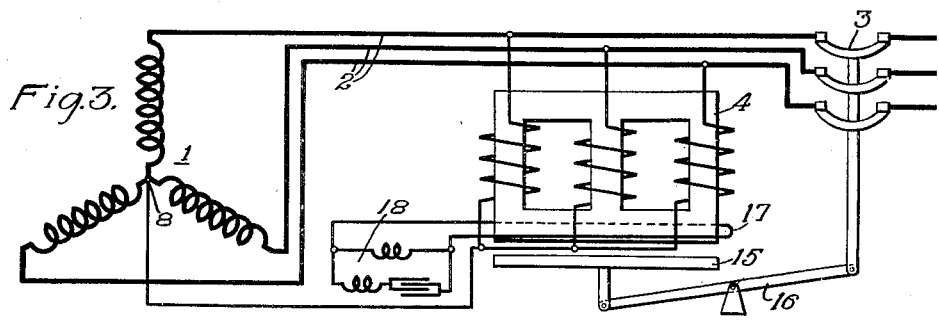
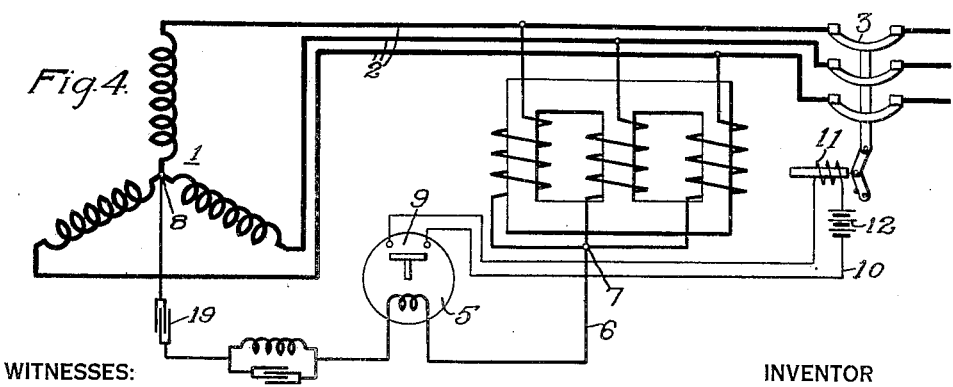
WITNESSES:
INVENTOR
Charles Le G. Fortescue.
BY
ATTORNEY Patented Feb. 2, 1926.

1,571,256

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

Application filed August 9, 1920. Serial No. 402,293.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Electrical Protective Devices, of which the following is a specification.

My invention relates to electrical protective devices and particularly to devices for protecting the internal windings of electrical translating devices.

One object of my invention is to provide a protective device that shall be responsive to internal faults in electrical windings.

Another object of my invention is to provide a protective device that shall be responsive to zero phase-sequence currents.

A further object of my invention is to provide a protective device, of the above indicated character, that shall be inexpensive to construct and effective in its operation.

In practicing my invention, I provide a star connected impedance device which is connected to the circuit to which the polyphase star-connected device to be protected is also connected. A relay is connected in the circuit between the neutral points of the devices and is adapted to control a circuit interrupter or other protective device. Since the neutral points are normally of the same potential, no current traverses the relay but, if a fault obtains in the winding of the device to be protected, the neutral point shifts with the consequent generation of zero phase-sequence currents that actuate a suitable relay. The relay circuit may be tuned to fundamental frequency to preclude its inadvertent operation by reason of the triple harmonic current which may traverse the same.

Figure 1 of the accompanying drawings is a diagrammatic view of an electric circuit embodying my invention and Figs. 2, 3 and 4 are diagrammatic views of electric circuits embodying modified forms of my invention.

A star-connected three-phase translating device 1 is connected to a polyphase circuit 2 and is provided with a circuit interrupter 3 for disconnecting the same when internal faults obtain therein.

In Fig. 1 of the drawings, a three-phase star-connected choke coil or impedance device 4 is operatively connected to the circuit 2 and a current-responsive relay 5 is connected in a circuit 6 between the neutral point 7 of the device 4 and the neutral point 8 of the device 1. The relay 5 is provided with contact members 9 for controlling a circuit 10 comprising a trip coil 11 and a source 12 of electromotive force. The trip coil 11 is adapted to trip the interrupter 3 when sufficient current traverses the relay 5 to effect engagement of the contact members 9.

The choke coil 4 is of relatively high impedance to the positive or negative phase-sequence components of the currents traversing the device 1 but is of relatively low impedance to the zero phase-sequence current. The impedance of each of the windings 14 on the inductive device is equal and since they are in star-connection and mounted on the same core member, their neutral point 7 cannot shift by reason of an unsymmetrical current traversing the circuit 2. However, internal faults in the translating device 1 may shift the neutral point 8 and cause an unsymmetrical current to be impressed upon the circuit 2. Zero phase-sequence currents then traverse the neutral conductor between the neutral points 7 and 8 and the relay 5 will be energized sufficiently to effect engagement of its contact members only when the fault obtains in the windings of the device 1.

In Fig. 2 of the drawings, condensers 13 are connected in shunt relation to the windings 15 of the impedance device 4 and the circuits, thus constituted, are anti-resonant to the triple harmonics of the circuit. With this arrangement, the relay 5 is prevented from operating on other than the fundamental frequency and thus will not operate incorrectly by reason of the traversal thereof of triple-frequency harmonics.

In Fig. 3 of the drawings, the device 4 is provided with a movable armature 15 which is connected, through a bell-crank lever 16, to the circuit interrupter 3. A single-turn conductor 17 is disposed around the device 4 and is connected to a shunt resonant circuit 18 which is resonant to triple harmonics and anti-resonant to currents of fundamental frequency. With this device, the relay 5 may be omitted and, when a fault obtains in the windings of the device 1, the leakage flux set up by the latter will attract the armature 15 and open the interrupter 3. However, triple harmonic currents will not actuate the same by reason of the resonant circuit 18.

In Fig. 4 of the drawings, a double-resonant device 19 is disposed in the circuit 6 between the neutral points 7 and 8 and is anti-resonant to triple harmonics and resonant to the fundamental frequency. With this arrangement, the relay 5 will be actuated to trip the interrupter 3 only when zero phase-sequence current of fundamental frequency traverses the circuit 6.

My invention is not limited to the use of the three-phase choke coil 4 as it is only necessary that a star-connected device be used having a neutral point which is substantially the same under all conditions. Other changes may be made in my invention without departing from the spirit and scope of the same, as set forth in the appended claims.

I claim as my invention:—

1. In an electric circuit, the combination with a polyphase translating device and a protective device therefor, of a polyphase impedance device connected to the circuit, a circuit between the neutral points of the devices, means whereby the protective device is actuated when current traverses the neutral circuit, and anti-resonance means for precluding the operation of the protective device when currents of a predetermined frequency traverse the neutral circuit.

2. In an electric circuit, the combination with a polyphase translating device and a protective device therefor, of a polyphase impedance device connected to the circuit, a circuit between the neutral points of the devices, a relay connected in the neutral circuit, and means for resonating the neutral circuit for predetermined frequencies.

3. In an electric circuit, the combination with a star-connected translating device and a protective device therefor, of a star-connected impedance device connected to the circuit, a relay connected between the neutral points of the translating and impedance devices for actuating the protective device when a fault obtains in the translating device, and antiresonance means for precluding the operation of the relay on triple harmonics.

4. In an electric circuit, the combination with a star-connected translating device comprising a plurality of windings and a protective device therefor, of a star-connected impedance device connected to the circuit, a relay connected between the neutral points of the translating and impedance devices for actuating the protective device when a fault obtains in the translating device and means whereby the relay is only responsive to currents of the normal frequency.

5. In an electric circuit, the combination with a star-connected translating device comprising a plurality of windings and a protective device therefor, of a star-connected impedance device connected to the circuit having such characteristics that its neutral point remains fixed relative to its component windings regardless of unsymmetrical conditions in the circuit, and a relay connected between the neutral points of the translating and impedance devices for actuating the protective device when a fault obtains in the translating device.

In testimony whereof, I have hereunto subscribed my name this 26th day of July 1920.

CHARLES LE G. FORTESCUE.